United States Patent
Singh et al.

(10) Patent No.: US 7,476,409 B2
(45) Date of Patent: *Jan. 13, 2009

(54) COLOR STABLE MEAT PRODUCT FOR AN EGG PRODUCT

(75) Inventors: Prem S. Singh, Glen Ellyn, IL (US); Deijing Fu, Lisle, IL (US); James Costelloe, Naperville, IL (US); Thomas Henry, McHenry, IL (US)

(73) Assignee: ConAgra Foods RDM, Inc., Omaha, NE (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/642,145

(22) Filed: Dec. 20, 2006

(65) Prior Publication Data
US 2007/0207251 A1 Sep. 6, 2007

Related U.S. Application Data

(60) Provisional application No. 60/778,952, filed on Mar. 3, 2006, provisional application No. 60/744,568, filed on Apr. 10, 2006, provisional application No. 60/861,782, filed on Nov. 30, 2006, provisional application No. 60/872,013, filed on Nov. 30, 2006.

(51) Int. Cl.
*A23L 1/314* (2006.01)
*A23L 1/317* (2006.01)

(52) U.S. Cl. .................................... 426/646
(58) Field of Classification Search ................. 426/641, 426/646
See application file for complete search history.

(56) References Cited

U.S. PATENT DOCUMENTS

| | | | |
|---|---|---|---|
| 2,899,311 A | 8/1959 | Zick | |
| 3,421,903 A | 1/1969 | Williams | 99/107 |
| 3,482,998 A | 12/1969 | Carroll et al. | |
| 3,523,802 A | 8/1970 | Wandel et al. | 99/229 |
| 3,982,003 A | 9/1976 | Mitchell et al. | |
| 4,409,249 A | 10/1983 | Forkner | 426/100 |
| 5,139,800 A | 8/1992 | Anderson et al. | 426/243 |
| 5,258,194 A | 11/1993 | Anderson et al. | 426/540 |
| 5,290,583 A | 3/1994 | Reznik et al. | 426/614 |
| 5,455,054 A | 10/1995 | Bryson et al. | 426/106 |
| 5,533,441 A | 7/1996 | Reznik et al. | 99/455 |
| 5,576,039 A | 11/1996 | Lewis | 426/250 |
| 5,614,244 A | 3/1997 | Heick et al. | 426/582 |
| 5,670,198 A | 9/1997 | Reznik et al. | 426/614 |
| 5,674,546 A | 10/1997 | Barnes et al. | 426/120 |
| 5,807,597 A | 9/1998 | Barnes et al. | 426/234 |
| 5,932,276 A | 8/1999 | Bhatia et al. | 426/614 |
| 6,090,425 A | 7/2000 | Samimi | 426/399 |

(Continued)

FOREIGN PATENT DOCUMENTS

| WO | WO 98/05216 | 2/1998 |
|---|---|---|
| WO | WO 2004/080188 | 9/2004 |

OTHER PUBLICATIONS

International Search Report and Written Opinion mailed Jul. 2, 2008.

(Continued)

*Primary Examiner*—Arthur L Corbin
(74) *Attorney, Agent, or Firm*—Merchant & Gould, P.C.

(57) ABSTRACT

The present invention is directed to a color stable meat product for storage in an egg product and the method of making such products by adding a color agent to a raw meat or by adding a color coating to a processed and/or cooked meat.

24 Claims, 5 Drawing Sheets

U.S. PATENT DOCUMENTS

| | | | | |
|---|---|---|---|---|
| 6,171,602 | B1 | 1/2001 | Roman | 424/401 |
| 6,270,830 | B1 | 8/2001 | Kamada et al. | 426/646 |
| 6,391,371 | B1 | 5/2002 | Bhatia et al. | 426/614 |
| 6,500,477 | B2 | 12/2002 | Wofford | 426/576 |
| 6,808,728 | B2 | 10/2004 | Hashisaka et al. | 426/249 |
| 6,878,394 | B2 | 4/2005 | Bodor et al. | 426/656 |
| 6,992,172 | B1 | 1/2006 | Chang et al. | 530/354 |
| 7,001,635 | B2 | 2/2006 | Merritt, II et al. | 426/412 |
| 2003/0224098 | A1 | 12/2003 | Mathews | 426/614 |
| 2004/0175476 | A1 | 9/2004 | Kross | 426/532 |
| 2005/0196513 | A1 | 9/2005 | Lewis et al. | 426/614 |
| 2006/0035006 | A1 | 2/2006 | McMindes et al. | |

OTHER PUBLICATIONS

"Astaxanthin, Nature's Super Carotenoid," by R. Todd Lorenz © 2000; BioAstin™ Technical Bulletin #062; Cyanotech Corporation; www.cyanotech.com; revised Oct. 2, 2000; 19 pages.

"Hot Topic: Carotenoids in Food," ENC Egg Nutrition Center, 1050 17th Street NW #560, Washington, D.C. 20036; www.enc-online.org; Fact Sheet; © 2004 all copy and images, per website; 2 pages.

"Biological Function and Cancer Prevention by Paprika Carotenoids," by Takashi Maoka, et al.; Foods Food Ingredients J. Jpn., vol. 209, No. 3, 2004; 1 page.

"Code of Federal Regulations," 9CFR 319, Animals and Animal Products, Chapter III—Food Safety and Inspection Service, Department of Agriculture,; www.cfsan.fda.gov/~lrd/9CF319.html; Nov. 9, 2006; 3 pages.

"Astaxanthin," by R. Todd Lorenz; © 2000; BioAstin™ Technical Bulletin #062; Cyanotech Corporation; www.cyanotech.com; revised Oct. 2, 2003; 3 pages.

"Paprika Carotenoids: Analysis, Isolation, Structure Elucidation," by Jozsef Deli, et al.; Organic Chemistry, vol. 6, No. 13, 2002; 1 page.

"Vitamins, Carotenoids, and Phytochemicals," © 2001 Nidus Information Services, Inc., 41 East 11th Floor, New York, NY 10003; http://www.well-connected.com/; file://D:\Ham\ham color\Vitamins, Carotenoids, and Phytochemicals.htm; Dec. 13, 2006; 31 pages.

COLOR STABLE MEAT PRODUCT FOR AN EGG PRODUCT

CROSS-REFERENCE TO RELATED APPLICATIONS

The present application claims the benefit under 35 U.S.C. § 119(e) of U.S. Provisional Application Ser. No. 60/778,952, filed Mar. 3, 2006, U.S. Provisional Application Ser. No. 60/744,568, filed Apr. 10, 2006, U.S. Provisional Application Ser. No. 60/861,782, filed Nov. 30, 2006, and U.S. Provisional Application Ser. No. 60/872,013, filed Nov. 30, 2006. Said U.S. Provisional Application Ser. No. 60/778,952, U.S. Provisional Application Ser. No. 60/744,568, Provisional Application Ser. No. 60/861,782, and U.S. Provisional Application Ser. No. 60/872,013 are herein incorporated by reference in their entirety.

FIELD OF THE INVENTION

The present invention generally relates to the field of food products, and more particularly to a meat product utilized as an ingredient in an egg product, such as a liquid egg product.

BACKGROUND OF THE INVENTION

Eggs are commonly prepared by scrambling and frying for a main or side dish in meals. Eggs are also included in combination with other various ingredients for production of baked goods or other foodstuffs including omelets, casseroles, pockets, and sandwiches.

More particularly, liquid egg products provide consumers with a convenient food product that exhibits desirable shelf stability and organoleptic qualities substantially similar to whole eggs, without the hassle of preparing whole eggs. Consumer expectations generally drive the demand for variety within liquid egg products, especially as liquid egg products become increasingly accepted by the consumer population.

However, while additional ingredients may be desirable, the color altering environment of egg products can cause detrimental alterations to some ingredients. Ham is given a cured color by the interaction of nitrites and myoglobin, but the color altering potential of egg whites interacts with the characteristic cured red color of the ham product, leaving the ham product an undesirable color, such as green, gray, and/or black. The color altering environment of the egg product may be generally defined as an environment that alters and/or degrades the interior and exterior color of a meat product during storage in the environment and during and after heating and/or cooking after storage in the environment. The oxidative environment of the egg product may cause these alterations. For example, an egg product may be predicted as oxidative by measuring the electrochemical potential of the liquid egg product.

Consumers are informed of freshness and desirability by a food's interior and exterior color. Unexpected colors are negatively perceived by consumers. Therefore, these alterations, such as changing the cured color of ham from red to green, may be negatively perceived by consumers resulting in unsatisfactory sales of specialized egg products.

Food processors spend great effort in working a lengthy temporal period of stability into their products. This effort is expended for both economic and safety reasons. It is apparent that retaining palatability is desirable to consumers, vendors, and processors alike, as it allows finished products to retain their value for a greater period of time. Further, pre-expectation spoilage may make the product undesirable during subsequent purchasing opportunities. Therefore, it would be desirable to provide a meat product that does not appreciably change color as an ingredient in an egg product.

SUMMARY OF THE INVENTION

Accordingly, the present invention is directed to a method for producing a color stable meat product, such as ham, that does not have an undesirable color after being stored in an egg product, such as a liquid egg product. A color stable meat product is formed by adding a color agent to a raw meat or by adding a color coating to a meat product. In one embodiment the embedded color agent includes caramel coloring and/or RED LAKE. In another embodiment, the color coating includes liquid smoke, colored gelatin coatings, colored starch coatings, colored protein coatings, browning agents, and/or shellac.

In one aspect of the present invention, an egg product is provided. The egg product includes a meat product as an ingredient having stable external color for at least the shelf-life of the egg product.

In another aspect of the present invention, an egg product is provided. The egg product includes a meat product as an ingredient having stable interior color for at least the shelf-life of the food product.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 5, a method for producing a color stable meat product 200 and/or 300 is shown in accordance with exemplary embodiments of the present invention. A color stable meat product is formed by adding a color agent to a raw meat or by adding a color coating to a meat product. A meat product of the present invention generally includes a processed and/or cooked meat. A meat composition of the present invention generally includes a raw and/or unprocessed meat.

Figure 1:
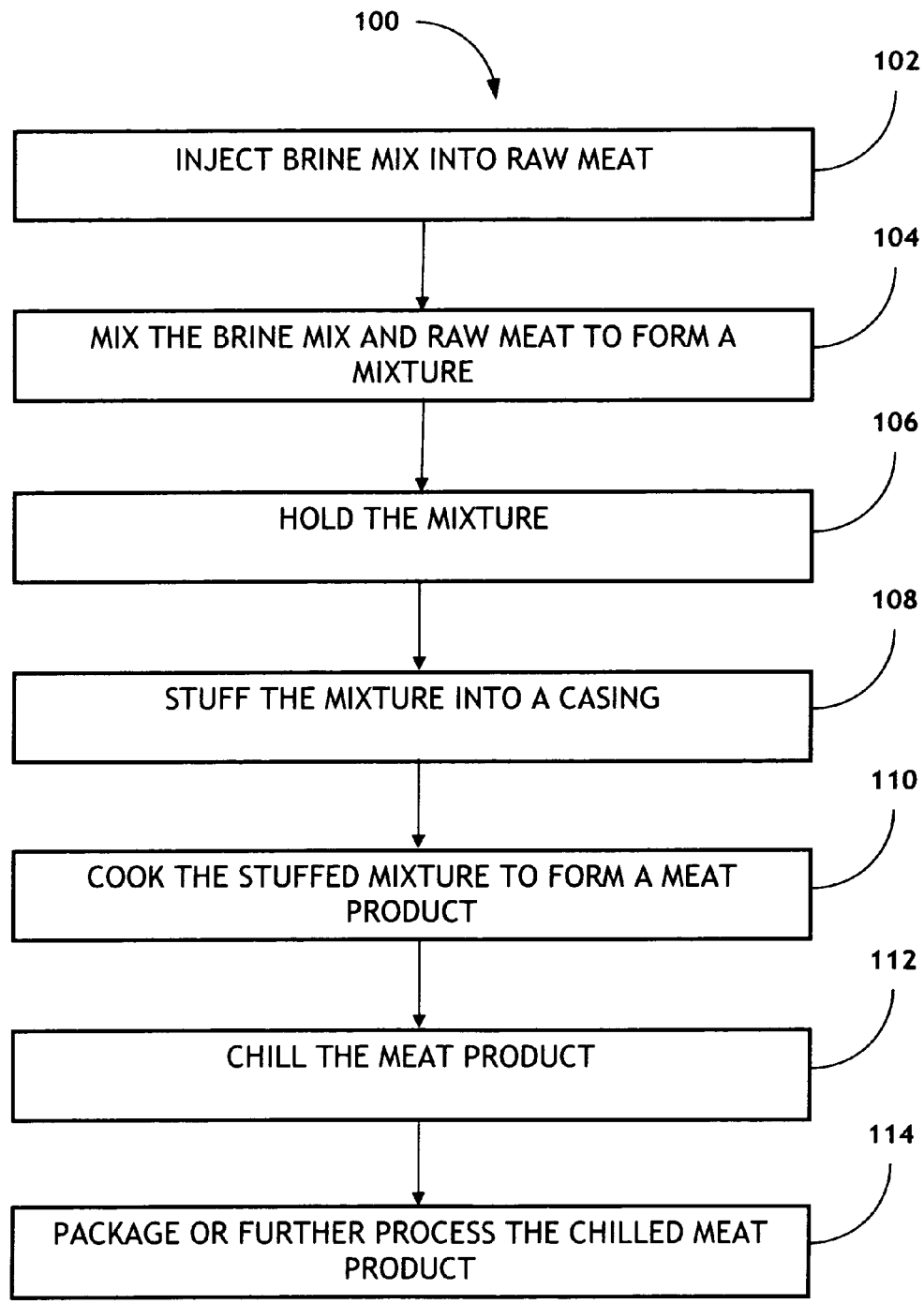
FIG. 1 is a flow diagram illustrating a method for processing a raw meat product in accordance with an exemplary embodiment of the present invention.

Referring now to FIG. 1, a method for processing raw meet 100 is illustrated in accordance with exemplary embodiments of the present invention. For example, in one specific embodiment a meat product, such as ham, is processed by injecting a brine mix including water, salt mix, a cure agent, and spices into raw ham 102, mixing or tumbling the injected brine mix and the raw ham to form a brine and raw ham mixture 104, holding the brine and the raw ham mixture 106 for at least 7.5 hours, stuffing the brine and raw ham mixture into a casing 108, cooking the raw ham and brine mixture 110 to an internal temperature of about 160° F. to about 165° F. to form a cooked ham product that is chilled 112 below 40° F. before packaging or further processing of the cooked ham product 114.

An embedded color agent of the present invention includes RED LAKE and caramel coloring. Typically, raw meat, such as raw ham, is processed by mixing and tumbling the brine mix with the raw ham. In the present invention, the whole meat muscle is comminuted and/or ground exposing greater surface area of the raw meat than a non-ground and/or non-comminuted meat product for increased contact with the color agent for better color absorption.

The color agent is added during the mixing of the brine mix with the ground and/or comminuted raw ham. The mixing step is done in order to facilitate contact between the surface of the ground and/or comminuted meat composition and the color agent. The color agent becomes embedded by seeping into the pores of the comminuted meat composition. The embedded color agent is retained throughout the processing of the meat composition to form a color stable meat product to be utilized as an ingredient in an egg product.

In one embodiment, the raw meat or meat composition may be comminuted by dicing, grinding, chopping, slicing, or some other way to increase the surface area available for contact with the embedded color agent or color coating utilized to retain the color of the meat product. As such, any of a variety of methods may be utilized to increase the surface area of the meat composition; however, grinding is an option that is both economical and easily accomplished. For instance, a grinder may be utilized to grind the meat composition. A grind equaling a $\frac{1}{16}^{th}$ of an inch plate may be utilized. The method may be part of a process with the grinding done in batches or as part of a continuous process.

Figure 2:
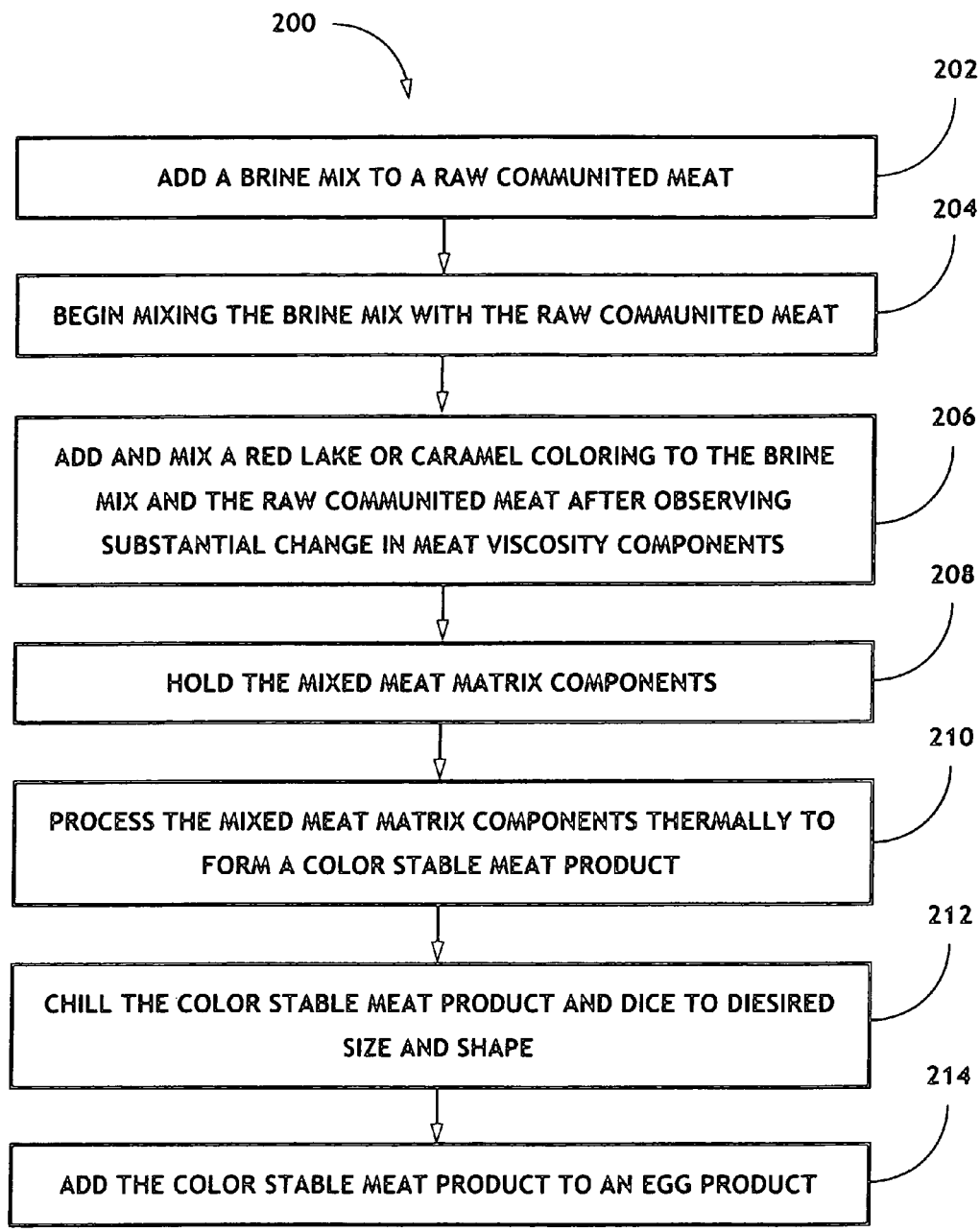
FIG. 2 is a flow diagram illustrating a method for producing a color stable meat product in accordance with an exemplary embodiment of the present invention, wherein an embedded color agent is utilized.

Referring generally to FIG. 2 a method for forming a color stable meat product for storage in an egg product 200 by utilizing an embedded color agent is shown in accordance with exemplary embodiments of the present invention. A brine mix is added to a raw comminuted meat or comminuted meat composition, 202. The brine mix is mixed with the comminuted meat composition, 204, causing salt soluble proteins to be extracted from the meat composition, which is observable by the tackiness and viscosity change of the meat composition. A color agent, such as RED LAKE or caramel coloring is added to and mixed with the mixture, 206. The mixed meat matrix components are held for about 5 to about 24 hours to let the meat absorb the color agent, 208. The held mixed meat matrix components may be stuffed in casings. The held mixed meat matrix components may be processed thermally, such as by cooking to a temperature above protein denaturation (above 140° F.) to form a color stable meat product, 210. The color stable meat product is chilled and diced, 212. The color stable meat product is then added to the egg product, 214, such as a liquid egg product.

In a specific embodiment, a caramel coloring may be utilized as the embedded coloring agent. Typically, the caramel coloring will be added in an amount equal to about 1.6% by weight of the meat product. Three exemplary variables of caramel coloring include #203, #610, and #624. After the caramel coloring is embedded in the raw ground and/or comminuted meat composition, the meat composition is cooked (i.e., with a convection oven) for about 1 minute to about 5 minutes at about 360° F. to about 400° F. during processing to form a color stable meat product.

In another embodiment, RED LAKE may be utilized as the embedded coloring agent. After the RED LAKE is embedded in the raw ground and/or comminuted meat composition, the meat composition is cooked (i.e. with a convection oven) for about 1 minute to about 5 minutes at about 360° F. to about 400° F. during processing to form a color stable meat product.

Of particular interest to the present invention are liquid egg products containing ham or the like utilized by consumers as a pourable omelet producing mixture. For example, popular pourable omelet producing mixtures include ham and cheese, Denver, southwestern, and ham and vegetable. However, eggs degrade the interior and exterior color of meats. In particular, ham, a desirable omelet ingredient, is particularly susceptible to color degradation in a liquid egg environment. Generally, liquid egg preparations have a 90 to 120 day shelf-life. Therefore, in a currently favored embodiment, as it relates to stabilizing ham in a liquid egg environment, it is desirable to stabilize ham in a manner which does not alter the ham to consumers, while preventing spoilage and/or color change in a liquid egg containing solution for about 90 to 120 days.

Thus, in such a currently favored exemplary embodiment, the formation of a stable ham product for storage in a liquid egg product is described below. Raw ham is treated by grinding ham trimmings into ⅛" by ⅙" pieces. Bones and gristle are removed from the ham trimming during grinding. The ground ham is mixed with a solution of ingredients including tocopherol acetate, anti-oxidants, liquid smoke, flavor protectors, and the coloring agent for one minute or until the ingredients are well mixed to form an ingredient solution. The ingredient solution is mixed with the salt and raw ham mixture until the coloring agent becomes embedded, by seeping into the meat product's pores, to form a first mixture (Mixture 1). Another solution of ingredients including water, ice, sodium, tripolyphosphate, sugar, and ascorbic acid are mixed until the ingredients have fully dissolved to form a clear solution. The clear solution is mixed with Mixture 1 for six minutes or until homogenous to form a homogenous mixture. The homogenous mixture is held overnight for a minimum of eight hours. The held mixture is stuffed into moisture proof log casings ranging in size from 0" to 4" in diameter. The stuffed meat in the casings is forced into 4"×4" metal mold and cooked with steam in an oven at approximately 140° F. for 60 minutes and at 175° F. until the internal temperature of the meat in the casings equals about 160° F. to about 165° F. The cooked ham is chilled with a cold potable water shower at approximately 60° F. for 30 minutes followed by air chilling at 36° F. The ham is diced after the meat casings are removed. The ham is diced to maximize particle size uniformity to offer the best consumer appeal. The diced ham is then screened to narrow the particle size distribution to around the mean. The diced ham may be added to a liquid egg product or further processed. The diced ham may be quick or flash frozen and gas flushed with $N_2$ or $CO_2$ to less than 1% oxygen in a box with an oxygen barrier liner. The flushed meat product may be shipped frozen or further processed (e.g., added to a meat and cheese slurry).

Other meat products, such as bacon, Canadian bacon, sausage, turkey, and other processed meats, may be stabilized by adding an embedded color agent. The embedded color agent may be added during tumbling after the raw meat has been injected with a brine mixture. For example, bacon may be stabilized with an embedded color agent in accordance with the present invention, wherein the embedded color agent is selected to provide the desired hue of cooked or uncooked bacon. It will be appreciated that the present invention may be utilized to provide a stable and uniform external and internal color to various meats by adjusting the recited exemplary embodiment. A Hunter calorimeter a-value may be selected to monitor the product color change during the storage and as an indication of the desired freshly cured and cooked color of ham. For example, turkey and a type of processed meat, such as pepperoni, are typically stabilized by mixing with an embedded color agent to give them an acceptable Hunter colorimeter a-value during storage in the liquid egg product with a 90 to 120 day shelf-life.

In another embodiment the color stable meat product may be formed by adding a color coating to a meat product. Color coatings of the present invention include liquid smoke, colored gelatin coatings, colored starch coatings, colored protein coatings, browning agents, and shellac. The meat product is fully processed before the color coatings are added.

Figure 3:
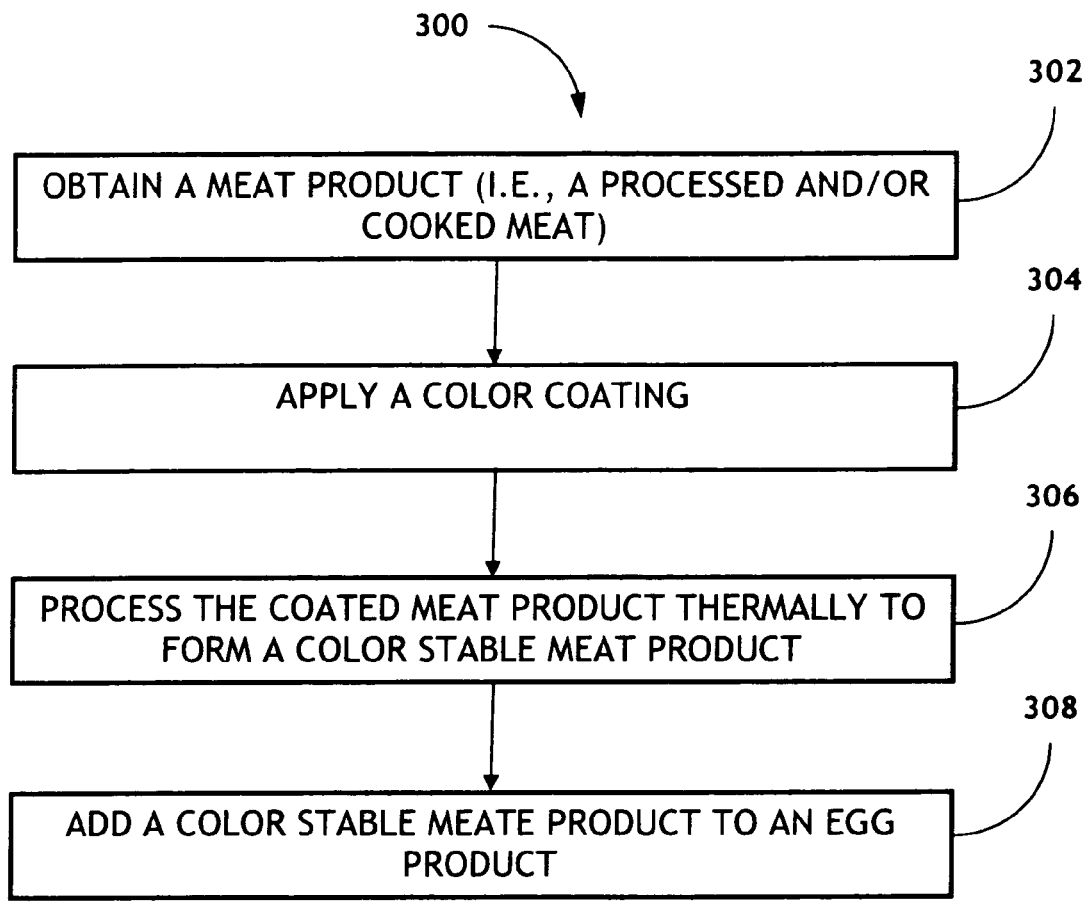
FIG. 3 is a flow diagram illustrating a method for producing a color stable meat product in accordance with an exemplary embodiment of the present invention, wherein a color coating is utilized.

Referring generally to FIG. 3 a method for forming a color stable meat product for storage in an egg product by utilizing a color coating 300 is shown in accordance with exemplary embodiments of the present invention. A meat product (i.e., a processed and/or cooked meat) is obtained 302. The color coating is applied to the meat product 304. The application of the color coating of the present invention may include soaking, spraying, drying, and/or coating. It will be understood that other methods of application may be utilized with the present invention without departing from the scope and spirit of the invention. The coated meat product is processed thermally, such as by drying and/or heating to form a color stable meat product 306. The color stable meat product is added as an ingredient to an egg product 308.

In a specific embodiment, a cooked meat product is soaked or sprayed in liquid smoke. This method may be desirable for imparting a natural color and smoke flavor to the meat product. This treatment is accomplished by the pyrolytic product of burning wood, typically hickory. The color may be from a phenol compound. In one embodiment, distilled liquid smoke may also be utilized with a coloring agent or another color coating. Distilled liquid smoke is a natural product that gives the meat product a smoky flavor without adding any coloring to the stable meat product. In another embodiment, low flavor liquid smoke may be applied to the meat product to allow the meat product to retain its color without adding a substantial amount of flavor.

The process of adding liquid smoke to the meat product comprises soaking the meat product in the liquid smoke for about 10 seconds to about 1 minute. The composition is dried for about 2 minutes to about 3 minutes at about 325° F. to about 375° F. to produce a color stable meat product.

In one embodiment, a colored gelatin, protein, or starch is added to the meat product. The gelatin, protein, or starch coatings and their coloring may be natural or artificial. In one specific embodiment, the process of dipping the meat product in a colored gelatin, starch, or protein coating comprises melting the coatings at about 125° F. to about 175° F. The cooked meat product is then soaked in the coatings at about 75° F. to about 150° F. for about 10 seconds to about 1 minute. Typically, the coatings will be added in an amount equal to about 10% by weight of the meat product and dried in an oven for about 2.5 minutes to about 3.5 minutes at about 250° F. to about 325° F.

In another embodiment, the colored gelatin, protein, or starch coating and liquid smoke are utilized to form a color stable meat product and/or to flavor the meat product. In a specific embodiment, a colored gelatin coating and liquid smoke are utilized to form a color stable meat product by melting the colored gelatin coating at about 125° F. to about 175° F. and then soaking the cooked meat product in the melted coating at about 75° F. to about 150° F. for about 10 seconds to about 1 minute. Typically, the coating will be added in an amount equal to about 10% by weight of the meat product and dried in an oven for about 2.5 minutes to about 3.5 minutes at about 250° F. to about 325° F. The composition is soaked in liquid smoke for about 10 seconds to about 1 minute. Typically, the liquid smoke will be added in an amount of about 15% to about 50% by weight of the meat product. The composition is dried in an oven at about 325° F. to about 375° F. for about 2 minutes to about 3 minutes.

In a further embodiment, a browning agent may be utilized to form a color stable meat product. Browning agents produce coloring through the burning of sugars. A browning agent (a certain type of sugar derivative) may be added to a product, such as a meat product, by spraying. While cooking, a browning agent, such as a Maillose, will undergo a Maillard reaction, which creates a natural golden and/or baked coloring. The color produced by browning agents is very stable and inert. Moreover, browning agents add substantially no taste to a product.

In a specific embodiment, the process of adding a browning agent comprises spraying the browning agent on a cooked meat product and then drying (i.e., with a convection oven) the composition for about 1 minute to about 5 minutes at about 360° F. to about 400° F.

The color stable meat product 200 and/or 300 is added to an egg product. How the stable meat product is added to the egg product will depend on the type of egg product being utilized and its characteristic altering environment. In a particular embodiment, where the egg product is a liquid egg product, the color stable meat product, such as ham, will typically be added to a heated starch slurry that may also contain cheese. The ham slurry may be added to the liquid egg product.

Figure 4:
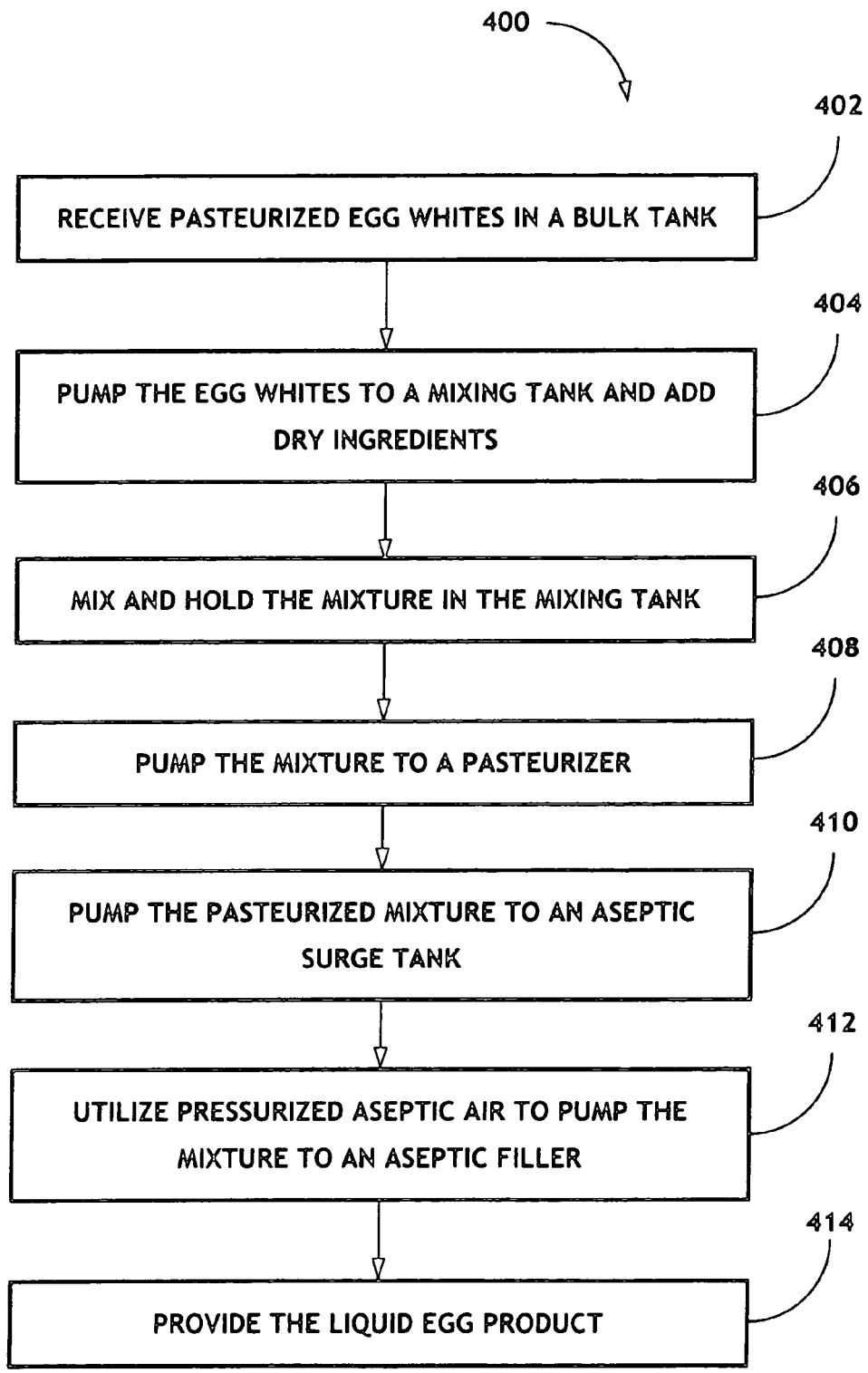
FIG. 4 is a flow diagram illustrating a presently preferred method for forming a liquid egg composition in accordance with an exemplary embodiment of the present invention.

In referring to the exemplary embodiment of FIG. 4, the process for forming a liquid egg product is illustrated, 400. Pasteurized egg whites from a bulk tank, 402, are pumped in to a mixing tank, 404. Dry ingredients, 404, are added to the mixing tank. The egg whites and dry ingredients are mixed until homogenous, 406. The mixture is then pasteurized, 408. For example, the pasteurization method disclosed in U.S. Pat. No. 5,096,728 herein incorporated by reference may be utilized. Additionally, the pasteurizer, 408, may comprise technologies such as heating (single or multi-stage), radiation, chemical, ultrasonic, high pressure pasteurization, some other suitable pasteurizing technique, and/or a combination of pasteurizing techniques. This list is exemplary only. It is contemplated that other suitable technologies may be utilized without departing from the scope and intent of the present invention. The pasteurized mixture is placed in an aseptic surge tank, 410. Pressurized aseptic air is utilized to pump the pasteurized mixture into a small reservoir tank in a controlled amount by weight of the mixture and then the mixture is pumped into an aseptic filler, 412, to produce the liquid egg product, 414.

Figure 5:
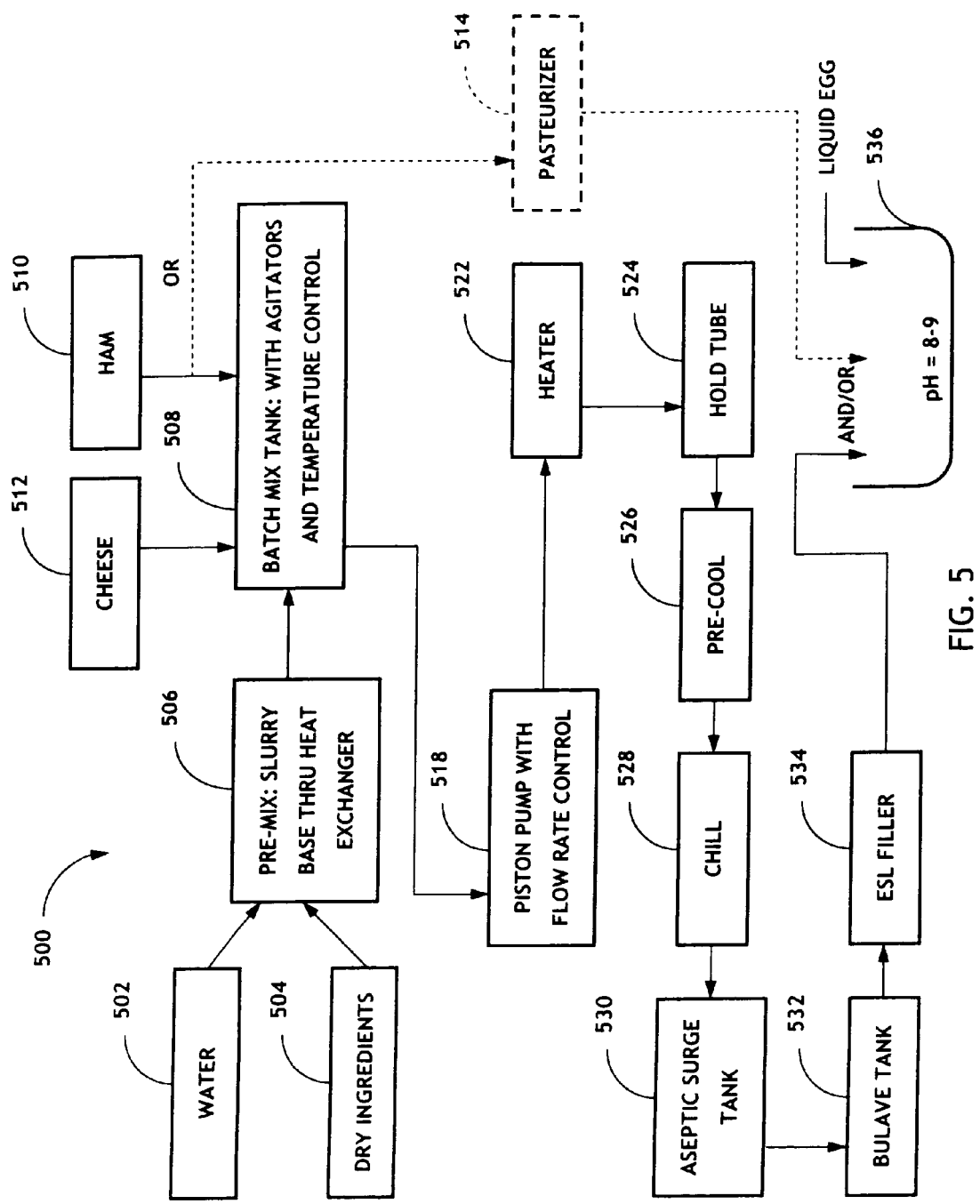
FIG. 5 is a flow diagram illustrating a presently preferred method for forming a ham slurry for incorporation in liquid egg in accordance with an exemplary embodiment of the present invention.

In referring to the exemplary embodiment of FIG. 5, the process for forming a liquid egg and stable ham product is shown, 500. Water, 502, and dry ingredients, 504, are premixed and heated to form a slurry base through a heat exchanger, 506. The slurry base is put into a batch mixing tank, 508, where diced color stable ham 510, (from FIGS. 2 and 3), and/or cheese, 512, may be added. However, the diced color stable ham may be pasteurized independently and added to the slurry.

The mixture with or without ham is sent from the mixing batch tank through a piston pump, 518, and a heater, 522. The slurry mixture is pumped through a hold tube to provide a residence time sufficient to provide a certain lethality kill value of microorganisms, 524. The slurry mixture is pre-cooled, 526, chilled, 528, and placed into an aseptic surge tank, 530. Pressurized aseptic air is utilized to pump the mixture into a filler bowl, 532 in a controlled amount by weight of the mixture. The mixture is pumped from the filler bowl into an ESL filler, 534, by a PD pump. Next, the slurry mixture is added to the liquid egg product, 536. A similar method disclosed by U.S. Pat. No. 5,266,338 incorporated by reference may be utilized. Additionally, if vegetables are desired, a vegetable slurry may be added to the liquid egg product. The vegetables may be added by utilizing the disclosed method of U.S. Pat. No. 4,910,036 herein incorporated by reference.

If the stable ham, 510, is not added to the mixing tank, the stable ham, 510, is sent to a pasteurizer, 514, that utilizes other pasteurizing techniques such as heating (single or multi-stage), radiation, chemical, ultrasonic, high pressure pasteurization, some other suitable pasteurizing technique, and/or a combination of pasteurizing techniques. This list is exemplary only. It is contemplated that other suitable technologies may be utilized without departing from the scope and intent of the present invention. The individually pasteurized diced ham may be directly added to the liquid egg and slurry product, 536.

It will be appreciated that a meat product and/or meat composition includes any ingestible tissue of mammals, birds, reptiles, or fish. A meat product and/or meat composition, therefore, includes, but is not limited to, tissue derived from cattle, porcine, poultry, ruminant (e.g. horse, bison, and deer), and fish sources. A meat product's and/or meat composition's color degrades in a degrading environment, such as a liquid egg environment. When a meat product's color degrades, it changes interior and exterior color.

Aspects which inform a consumer of relative freshness of any food product, such as meat products, are color, flavor, texture, and odor. Color, flavor, texture, and odor are generally utilized by consumers to determine whether a meat product is desirable. A color stable meat product describes a meat product that substantially retains color during storage in an egg product (i.e., a liquid egg product), for at least the shelf-life of the egg product. A color is substantially maintained if the color does not appreciably fade from its consumer desirable tint. For example, the shelf-life of a refrigerated egg product is the average time period from production to the date the product expires and/or spoils and/or becomes undesirable, which is typically between about 2 and about 18 months.

An egg product may be generally defined as any whole egg, egg white, egg yolk, and/or egg substitute based product including a product with a solid, liquid, and/or a semi-moist environment. For example, a food product is whole egg, egg white, egg yolk, and/or egg substitute based if these egg components comprise over 50% by weight of the food product. Generally, the environment of the egg product alters and/or degrades the color of a meat during storage in the egg product environment, such as an oxidative egg product. For instance, an egg product may be predicted as oxidative by measuring the electrochemical potential of the food composition (As shown in Example 3, which illustrates that both liquid egg substitute containing egg white and egg whites had comparatively high oxidative potentials.). For example, a liquid egg product may include one or more of the following including whole egg, egg white, egg yolk, and egg substitute. The liquid egg product may be refrigerated and/or pasteurized. The liquid egg product may also include products such as cheeses, vegetables, condiments, flavorings, and/or food additives.

EXAMPLE 1

Ham and egg compositions were prepared for color testing. First, ham by itself was prepared for testing. Second, a ham and liquid egg composition was prepared for testing.

Ham Slurry Procedure:

In another embodiment of the present invention, the following steps were followed to prepare the ham mixture. Ham was diced into ¼"×¼"×⅛" sized pieces. Water was placed in the upper pot of a double boiler and then starch and salt were dispersed into the water and mixed well. Next, cheeses and the diced ham were added to the water in the upper pot of the double boiler as it was heated. As soon as the temperature reached 198° F. the lid was tightly placed on the upper pot of a double boiler. Meanwhile, water was placed in the lower pot of the double boiler and kept boiling. Next, the upper pot was placed on the lower pot of the double boiler and the batch was allowed to cook with the lid tightly closed for about 10 more minutes. The heat was turned off and the upper pot of the double boiler was transferred to an ice water bath to cool.

Ham and Cheese Liquid Egg Sample Preparation:

A scale is placed under a tissue culture hood (hood). The entire scale is wiped with a paper towel spread with alcohol. Plastic spoons are wiped with an alcohol wipe and stored in a sterilized beaker. The beaker is placed under the hood. Another sterilized beaker is placed next to the scale. An ultraviolet light is turned on for 10 minutes to sterilize the environment.

Under the hood, the caps from the liquid egg product cartons are removed, placed upside down, sprayed with alcohol, and then allowed to dry. Next, the rim of the spout is wiped with an alcohol wipe and the spout's tab is pulled. The cartons are set aside. The ham slurry pot is placed under the hood. The lip of the pot is removed while under the hood. The ham and cheese slurry is mixed in ratio of 11% basis total weight of finished egg composition.

The samples were then packaged in different environments.

Packaging:

For non-vacuumed samples, the cartons were recapped and then labeled with sample numbers. For gas flush samples, the ham and cheese liquid egg mixture was poured into an oxygen barrier bag, which was vacuum packed by pulling the air out of the packages to lower the oxygen level below 1% and then flushed with a gas mixture of 20% $CO_2$ and 80% $N_2$.

EXAMPLE 2

The ham products prepared in Example 1 were analyzed for color retention using Hunter colorimeter a-value as illustrated below.

| | Hunter Colorimeter a-Value | | | |
| --- | --- | --- | --- | --- |
| Weeks | Control-Ham | Control Ham with Nitrogen flush | RED LAKE | Liquid Smoke |
| 0 | 11.00 | 11.00 | 22.60 | 12.69 |
| 2 | 0.67 | | 14.31 | |
| 4 | −0.04 | | 11.03 | 5.39 |
| 6 | −0.01 | 2.78 | 5.29 | 5.76 |
| 8 | 1.03 | 2.34 | 7.25 | Inside color fade |
| 10 | 1.00 | 2.77 | 8.39 | |
| 15 | | −3.18 | 6.00 | |

The control ham represents a typically processed ham product without an embedded color agent or a color coating. The control ham had a Hunter colorimeter a-value of −0.01 and the control ham with nitrogen flush had a Hunter calorimeter a-value of 2.78 after six weeks of storage in a liquid egg product. In comparison, a ham product treated with RED LAKE had a much higher Hunter colorimeter a-value of 5.29 along with a ham product treated with liquid smoke having a Hunter calorimeter a-value of 5.76 after six weeks of storage in a liquid egg product. Moreover, the RED LAKE treated ham product had an 8.39 Hunter colorimeter a-value after 10 weeks in comparison to control-ham with a 1.00 Hunter colorimeter a-value and control ham with nitrogen flush with a 2.77 Hunter calorimeter a-value. Therefore, it is apparent that RED LAKE and liquid smoke substantially retains more color and color for longer than control-ham and control ham with nitrogen flush. While the liquid smoke treated ham, control ham, and control ham with nitrogen flush did not substantially maintain interior color, the RED LAKE treated ham did retain its interior color.

EXAMPLE 3

Other methods and products were utilized to produce a ham product that would retain its color while being stored in a food product. The compositions are listed below.

| Test # | Preparation |
| --- | --- |
| 1 | Lunch meat ham coated with 10% gelatin solution and dried in oven-control |
| 2 | Lunch meat ham coated with 10% gelatin solution dried in oven and dipped in 40% liquid smoke. |
| 3 | Lunch meat ham coated with 10% gelatin solution dried in oven and dipped in liquid 100% smoke. |
| 4 | Caramel Color 203 Ham-control |
| 5 | Caramel Color 203 Ham-liquid smoke |
| 6 | Caramel Color 203 Ham-1.60% 203 caramel color solution coating |
| 13 | Caramel Color 203 Ham with egg white-control |
| 14 | Caramel Color 203 Ham with egg white-liquid smoke |
| 15 | Caramel Color 203 Ham egg white-1.60% 203 caramel color solution coating |
| 24 | Ham with 35% egg white-control |
| 25 | Ham with 35% egg white-liquid smoke |

*Liquid smoke 40%
**Oven condition for liquid smoke and caramel color
***Time 6.12 minutes
****Temperature: 280° F.

EXAMPLE 3

The oxidative potential for fading was also determined. In particular, egg whites, a liquid egg substitute containing egg white, and a liquid egg substitute containing egg white and control ham were tested. The results are illustrated in FIG. 5. The electro-chemical potential was +127 mV for liquid egg substitute containing egg white, +80 mV for egg whites, and +5 mV for liquid egg substitute containing egg white and control ham.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for producing a food product, comprising:
   adding a comminuted meat composition to a brine mix;
   mixing a color agent with the comminuted meat composition and the brine mix to form a meat mixture;
   thermally processing the meat mixture to form a color stable meat product; and
   adding the color stable meat product to an egg product,
   wherein the color of the color stable meat product is retained for substantially the shelf-life of the egg product.

2. The method of claim 1, wherein the color agent is selected from the group consisting of caramel coloring and RED LAKE.

3. The method of claim 1, wherein the comminuted meat composition is thermally processed by cooking for 3 minutes at 380° F.

4. The method of claim 1, wherein the comminuted meat product is comminuted by dicing.

5. The method of claim 1, wherein the comminuted meat product includes at least one of ham, turkey, bacon, Canadian bacon, sausage, and pepperoni.

6. The method of claim 1, wherein the egg product is a liquid egg product.

7. The method of claim 1, wherein the egg product has a shelf-life of about 90 days.

8. The method of claim 1, wherein the color stable meat product retains interior and exterior color.

9. A method for producing a food product, comprising:
   applying a color coating to a comminuted meat product;
   thermally processing the coated meat product to form a color stable meat product; and
   adding the color stable meat product to an egg product,
   wherein the color of the color stable meat product is retained for substantially the shelf-life of the egg product.

10. The method of claim 9, wherein the color coating is a liquid smoke.

11. The method of claim 10, wherein the comminuted meat product is soaked in the liquid smoke for 30 seconds.

12. The method of claim 10, wherein the comminuted meat product is thermally processed by drying for 2.5 minutes at 350° F.

13. The method of claim 9, wherein the color coating includes colored gelatin coatings, colored starch coatings, and colored protein coatings.

14. The method of claim 13, wherein the colored gelatin, starch, and protein coatings are heated to 150° F. before the comminuted meat product is soaked in the coating for 30 seconds at 110° F.

15. The method of claim 13, wherein the colored gelatin, starch, and protein coatings are thermally processed by drying for 3 minutes at 280° F.

16. The method of claim 13, wherein the colored gelatin, starch, and protein coatings are added in amount of about 10% by weight of the color stable meat product.

17. The method of claim 9, wherein the color coating is a browning agent.

18. The method of claim 17, wherein the browning agent is thermally processed by cooking for 3 minutes at 350° F.

19. The method of claim 9, wherein the color coating is shellac.

20. The method of claim 9, wherein the comminuted meat product is comminuted by dicing.

21. The method of claim 9, wherein the comminuted meat product includes at least one of ham, turkey, bacon, Canadian bacon, sausage, and pepperoni.

22. The method of claim 9, wherein the egg product is a liquid egg product.

23. The method of claim 9, wherein the egg product has a shelf-life of about 90 days.

24. The method of claim 9, wherein the color stable meat product retains exterior color.

* * * * *